(12) United States Patent
Konno et al.

(10) Patent No.: US 7,108,651 B2
(45) Date of Patent: Sep. 19, 2006

(54) CENTRIFUGE HAVING MULTIPLE ROTORS

(75) Inventors: Tatsuya Konno, Hitachinaka (JP); Yoshitaka Niinai, Hitachinaka (JP); Masahiro Miura, Yokosuka (JP); Shoji Kusumoto, Hitachinaka (JP); Takahiro Shimizu, Hitachinaka (JP)

(73) Assignee: Hitachi Koko Co., Ltd., Tokyo (JP)

( * ) Notice: Subject to any disclaimer, the term of this patent is extended or adjusted under 35 U.S.C. 154(b) by 169 days.

(21) Appl. No.: 10/475,184

(22) PCT Filed: Apr. 19, 2002

(86) PCT No.: PCT/JP02/03928

§ 371 (c)(1),
(2), (4) Date: Mar. 1, 2004

(87) PCT Pub. No.: WO02/085526

PCT Pub. Date: Oct. 31, 2002

(65) Prior Publication Data

US 2004/0138041 A1 Jul. 15, 2004

(30) Foreign Application Priority Data

Apr. 20, 2001 (JP) .............................. 2001-122561

(51) Int. Cl.
*B04B 5/02* (2006.01)
*B04B 9/12* (2006.01)

(52) U.S. Cl. .............................. 494/84; 494/16; 494/20; 464/182

(58) Field of Classification Search .................. 494/16, 494/20, 33, 43, 46, 83, 84; 464/179, 182
See application file for complete search history.

(56) References Cited

U.S. PATENT DOCUMENTS

| | | | | | |
|---|---|---|---|---|---|
| 3,770,191 A | * | 11/1973 | Blum | ........................... | 494/46 |
| 3,779,451 A | * | 12/1973 | Lehman | ....................... | 494/16 |
| 3,938,354 A | * | 2/1976 | Lehman | ....................... | 464/52 |
| 4,201,066 A | * | 5/1980 | Nolan, Jr. | ..................... | 464/97 |
| 4,897,075 A | * | 1/1990 | Sharples | ........................ | 494/84 |
| 5,342,282 A | * | 8/1994 | Letourneur | .................. | 494/82 |
| 5,443,438 A | * | 8/1995 | Wright et al. | ................. | 494/84 |
| 5,456,653 A | * | 10/1995 | Wright | ........................ | 494/82 |
| 6,024,687 A | * | 2/2000 | Cheng | .......................... | 494/84 |
| 6,149,571 A | * | 11/2000 | Okada et al. | ................. | 494/20 |
| 6,183,408 B1 | * | 2/2001 | Wright et al. | ................. | 494/82 |
| 2004/0138041 A1 | * | 7/2004 | Konno et al. | ................. | 494/84 |
| 2006/0058169 A1 | * | 3/2006 | Matusima | .................... | 494/84 |

FOREIGN PATENT DOCUMENTS

| | | |
|---|---|---|
| DE | 3618335 A1 * | 12/1986 |
| JP | 2-48142 | 4/1990 |
| JP | 9-141136 | 6/1997 |

(Continued)

*Primary Examiner*—Charles E. Cooley
(74) *Attorney, Agent, or Firm*—McGuire Woods LLP

(57) ABSTRACT

In a centrifugal chamber 9, an elastic rotation shaft 30 and a high-rigidity rotation shaft 34 extend coaxially. When a rotor selected from an angle rotor 17 and a swing rotor 36 which have different sizes and shapes is set in the centrifugal chamber 9, an optimal shaft is connected automatically to the selected rotor. The angle rotor 17 having a low tendency toward mass eccentricity is supported and rotated by the elastic rotation shaft 30 for high-speed rotation. The swing rotor 34 having a high tendency toward mass eccentricity is supported by the high-rigidity shaft 34 for low-speed rotation. Rotation torque is transmitted to the swing rotor 34 from the elastic rotation shaft.

26 Claims, 8 Drawing Sheets

FOREIGN PATENT DOCUMENTS

| | | | |
|---|---|---|---|
| JP | 9-164343 | * | 6/1997 |
| JP | 9-239293 | * | 9/1997 |
| JP | 2002-513673 | | 5/2002 |
| JP | 2005-58919 | * | 3/2005 |
| JP | 2005-111417 | * | 4/2005 |
| JP | 2005-111418 | * | 4/2005 |
| JP | 2004-237201 | * | 8/2005 |
| WO | 83/03985 | * | 11/1983 |

* cited by examiner

CENTRIFUGE HAVING MULTIPLE ROTORS

TECHNICAL FIELD

The present invention relates to a centrifuge, and more particularly, to a drive structure of the centrifuge in which a suitable rotor selected from a plurality of kinds of rotors can be changed and set on an optimal shaft.

BACKGROUND ART

In conventional centrifuges, rotation torque obtained from a power generator such as an electric motor or the like is transmitted to a rotor via a rotational drive shaft to rotate the rotor. A plurality of test tubes each encapsulating a sample can be set on the rotor, and the samples in the test tubes are subjected to centrifugal separation by rotation of the rotor. Angle rotors, swing rotors, and the like are used for the centrifuges of this kind. The amounts of samples vary according to test tubes, depending on the extent of collection of blood or the like. Therefore, when a plurality of test tubes thus enclosing samples of different masses are set on the rotor, the barycenter of the whole rotor and test tubes tends to deviate from the rotational axis, i.e., there must be so-called mass eccentricity.

As shown in FIG. 10, an angle rotor A has a round circular shape, as a whole, and a plurality of test-tube insertion holes are formed at a predetermined angle to the rotation axis X. The angle rotor A has a relatively small size and does not undergo severe restriction of centrifugal stress due to the dead weight of itself. In addition, high processing accuracy can be attained because the angle rotor is manufactured by machining. Also, the tendency toward mass eccentricity is low during rotation because the number of attachable test tubes is small. As a result, the angle rotor A used for a centrifuge called a multi-cooling centrifuge which has the maximum rotation speed of 10,000 rpm or so cannot centrifuge much amounts at once but is suitable for centrifugation within a high-speed rotation range of, for example, 6,000 rpm to 10,000 rpm. Although the definition of the high-speed rotation rotor is not clear, the high-speed rotation rotor is used for centrifugation or separation of samples which require high centrifugal acceleration.

On the other side, as shown in FIG. 11, a plurality of (four) arms extend horizontally in radial directions from the axis X in case of a swing rotor S. The distal end of each arm is branched into two. Pins are provided in directions of opposite branches of adjacent arms. A bucket having a shape like a bottomed cylinder is pivotally movably supported to each pair of pins. Each bucket is provided with engaging portions corresponding to the pins. The engaging portions are detachable from the pins. A rack in which a plurality of test-tube holes are formed is provided in each bucket. Test tubes are inserted in these test-tube holes. In operation of centrifugation, buckets are engaged with and hang on all of the arms by the pins while two buckets are omitted from FIG. 11 to help easy understanding. When the swing rotor S set on the centrifuge reaches a predetermined rotation speed, each bucket pivotally moves to the horizontal direction about the pins due to centrifugal force, and thus, componential separation is performed on the samples.

The swing rotor S is larger as compared with the angle rotor A, and is advantageous in that a greater number of test tubes can be inserted. However, the greater number of inserted test tubes means also a tendency to greater variants among the samples filled in the test tubes. The swing rotor has a large radius of rotation and a center portion has a relatively small mass. Further, each arm of the swing rotor S has a complicated shape, and is manufactured by casting for the purpose of reduction in manufacturing-cost in many cases. In these cases, the dimensional accuracy is lower than that of the angle rotor A. Further, each bucket is detachable from the pins, so that there is a rattling between the engaging portions of the buckets and the pins. As mentioned above, centrifugal stress generated at the pins and the engaging portions is large in the swing rotor S. Further, there are great variants among samples, considering the mass. Consequently, tendency toward mass eccentricity is greatly higher as compared with the angle rotor A, and is thus not suitable for high-speed rotation. Therefore, the swing rotor is used mainly for centrifugal separation dealing with a large number of test samples within a low-speed rotation range of, for example, 2,000 to 5,000 rpm.

Next, a rotation drive shaft of a centrifuge will be described in relation to reaction force from a bearing. In case of making a large rotor usable at a low rotation speed, rigidity of the rotation shaft is increased and the flexural vibration frequency is shifted to a higher speed than a normal operating range, to improve the operation ability with high rigidity. A specific description will now be made on the basis of FIG. 12. FIG. 12 shows a rotating situation in which a rotor R1 is coaxially connected to a high-rigidity shaft S1, and the high-rigidity shaft S1 is also coaxially connected to an output shaft of a motor M as a power generator. The high-rigidity shaft means a shaft which is rigid within a range of operational rotation speed. At this time, the output shaft of the motor M is supported on a motor housing or the like not shown, by a bearing B. Where the mass of the rotor R1 is m, deviation of an actual barycenter position from a geometric center is $\epsilon$ which is induced from imbalance of the rotor, the rotational angular speed is $\omega$, flexure of the high-rigidity shaft S1 is $\rho$, and flexural rigidity of the high-rigidity shaft S1 is k, centrifugal force Fs induced by the imbalance is expressed as follows, according to "Dynamics of rotary member" co-authored by R. Gasch and H. Pfutzner, translated by Shuzo Miwa, published by Morikita-shuppan".

$$Fs = m\epsilon\omega^2$$

The bearing reaction force Fu is obtained as follows.

$$Fu \times L_1 = (L_1 + L_2) \times Fs$$

$$Fu = \{(L_1 + L_2)/L_1\} \times m\epsilon\omega^2$$

Obtained hence is the relationship of $Fu \propto \omega^2$.

On the other hand, in case of rotating the rotor at a high speed, an elastic shaft is used as the rotation drive shaft. The elastic shaft described herein is a shaft which is elastically deformed, e.g., bent within a range of operational rotation speed. Flexural rigidity of the rotation drive shaft is lowered in the elastic shaft, so that the flexural natural frequency is within a low-speed range during rotation. That is, the elastic shaft is arranged so that the reaction force due to imbalance is reduced in the high-speed side. More specifically, FIG. 13 shows a rotating situation in which a rotor R2 is coaxially connected to an elastic shaft S2, and the elastic shaft S2 is coaxially connected to an output shaft of a motor M. At this time, the output shaft of the motor M is supported on a motor housing or the like (not shown) through a bearing B. Where the mass of the rotor R2 is m, deviation of an actual barycenter position from a geometric center is $\epsilon$ which is induced from imbalance of the rotor, the rotational angular speed is $\omega$, flexure of the elastic shaft S2 is $\rho$, and flexural rigidity of the elastic shaft S2 is k, centrifugal force Fd induced by the imbalance is expressed as follows.

$$Fd = m(\epsilon+\rho)\omega^2 = \rho k$$

From this expression, ρ is obtained as follows.

$$\rho = m\epsilon\omega^2/(k-m\omega^2)$$

Provided that the flexural natural frequency is represented by $\sqrt{(k/m)} = \omega_n$, $k = m\omega_n^2$ is given and the following is obtained.

$$\rho = \epsilon \times (\omega/\omega_n)^2 / \{1-(\omega/\omega_n)^2\}$$

When $\omega/\omega_n = 1$ exists, i.e., when the rotation speed is equal to the flexural natural frequency (at the resonance point), the flexure becomes infinite. After the rotation speed exceeds the natural frequency, the flexure comes asymptotically close to ε. Therefore, after the rotation speed exceeds the natural frequency and the rotation speed further increases, the bearing reaction force Fu' then takes the following relationship.

$$Fu' \propto \epsilon k$$

Differences in bearing reaction force between the high-rigidity shaft and the elastic shaft are shown in a graph in FIG. 14. In this graph, the ordinate axis represents the bearing load F and the abscissa axis represents the angular speed ratio. Since the high-rigidity shaft has high rigidity, it provides good usability. However, the bearing reaction force due to imbalance increases sharply as the rotation speed increases. On the other side, the elastic shaft has a resonance point at a low speed (the area of 1.0). However, stable rotation can be achieved at a high speed after the rotation speed exceeds the resonance point. Note that the flexure at the resonance point can be reduced to be low by providing an external damping mechanism.

In view of the foregoing, if an elastic shaft is adopted when both of a high-speed rotor and a bulky low-speed rotor are to be used in one centrifuge, stable rotation is obtained at a high speed. However, the rigidity of the shaft is so low that the rotation shaft easily bends if the bulky rotor is attached to the rotation shaft. In some cases, the rotation shaft may be broken. In addition, the rotor having a large volume causes great imbalance at samples treated by users, as described previously. Therefore, if the large swing rotor is rotated on an elastic shaft, the primary natural frequency (primary resonance point) of flexure of the rotation shaft becomes so large that the rotating rotor may contact fixed components or the rotation shaft may be bent and broken. To summarize the above, when an elastic shaft is adopted, the high-speed angle rotor provides good usability but the low-speed swing rotor provides adverse usability or cannot be mounted.

On the other side, when a high-rigidity shaft is adopted, the low-speed swing rotor provides good usability but bearing reaction force caused by imbalance of samples increases in proportion to square of the rotation speed. Therefore, no problem appears within a low-speed rotation range but the load to the bearing increases within a high-speed rotation range. Consequently, problems appear in that the lifetime of the bearing is shortened and the birling noise is large. It is hence inevitable to restrict the allowable amount of imbalance of samples to be small, and the user must take labor for adjusting amounts of samples in test tubes in uniform fashion. This is a factor of adverse usability. To summarize the above, when a high-rigidity shaft is adopted, the large low-speed rotor provides good usability while the high-speed rotor provides adverse usability.

The present invention has been made in view of the above drawbacks, and has an object to provide a centrifuge capable of selectively installing various rotors therein without sacrificing operability of the selected rotor.

DISCLOSURE OF THE INVENTION

The object described can be achieved by providing a plurality of shafts for a drive section of a centrifuge and allowing a suitable shaft to be selected in accordance with the shape, mass, type, maximum rotation speed, or the like of a rotor to be used.

That is, the present invention provides a centrifuge for selectively mounting and rotating a rotor among at least two rotors including a first rotor and a second rotor each having a kind or a size different from each other, the centrifuge including a main body, a power generator supported by the main body and having an output shaft which generates rotation torque, the power generator supporting the output shaft via a bearing, a rotation drive shaft that drivingly connects the selected first rotor to the output shaft to transmit the rotation torque to the first rotor, and a support shaft that supports the selected second rotor, the support shaft (a) being rotatable by the rotation of the rotation drive shaft via the selected second rotor, or (b) being rotatable through direct connection to the output shaft, or (c) being unrotatably extending with providing an additional bearing to the support shaft.

Since the centrifuge is provided with a plurality of shafts, a shaft suitable for the rotor to be used can be selected, so that labor of adjusting imbalance between samples is unnecessary without sacrificing usability of the rotor. In addition, the selected shaft is provided with a bearing or bearings of a suitable type, rigidity, size, and/or number, in compliance with the shape and/or type of the rotor to be used. As a result, the lifetime of the bearing and a centrifuge device product can be prolonged.

Preferably, the rotation drive shaft and the support shaft are coaxial with the output shaft.

Further preferably, the rotation drive shaft has a first crown portion engageable with the first rotor to support the rotating first rotor, and the support shaft is formed with a space allowing the rotation drive shaft to extend therethrough, and the support shaft has a second crown portion engageable with the second rotor to support rotating second rotor. Thus, the selected rotor can be associated with a suitable shaft merely by setting the rotor on the crown portion.

Further preferably, the support shaft is rotatably supported by the main body via a bearing, the second rotor being connected also to the first crown portion and rotationally driven by the rotation drive shaft, while being supported by the second crown portion, provided that the support shaft is rotatable by the rotation of the rotation drive shaft via the selected second rotor.

Further, preferably, the support shaft is disconnected from the output shaft and supports a thrust load and a radial load from the selected second rotor or only supports the radial load of the selected second rotor, and the rotation torque and/or the thrust load are transmitted to the second rotor by the crown portion of the rotation drive shaft, provided that the support shaft is rotatable by the rotation of the rotation drive shaft via the selected second rotor.

Further, preferably, the rotation drive shaft provides a flexural rigidity different from that of the support shaft. In this case, the rotation drive shaft provides a flexural natural frequency in an operational rotation speed range when the first rotor is selected, and the support shaft is rotated at a speed lower than a dangerous speed at which flexural natural frequency occurs when the second rotor is selected.

Further, the rotation drive shaft is an elastic shaft, and the support shaft is a high-rigidity shaft which is rigid within an operational rotation speed range, and wherein the first rotor has an allowable rotation speed higher than that of the second rotor.

Further, preferably, at least one cylindrical rotation shaft is rotatably provided around and coaxial with the support shaft, and the at least one cylindrical rotation shaft has a third crown portion for supporting a third rotor having a load different from that of the second rotor.

Further, preferably, the second rotor is rotatably supported to the support shaft via a bearing, and the second rotor is connected also to the first crown portion and rotated by the rotation drive shaft and supported by the second support shaft, provided that the support shaft unrotatably extends.

Alternatively, the support shaft is directly connected to the output shaft, for drivingly rotating the second rotor and for supporting the second rotor.

Further, preferably, at least one first pin protrudes from and is fixed to the fist crown portion of the rotation drive shaft, and at least one second pin protrudes from and is fixed to a portion of the first rotor or a portion of the second rotor, each portion being connectable to the first crown portion. Rotational torque of the rotation drive shaft is transmitted to the first rotor or the second rotor upon contact between the first pin and the second pin.

The present invention further provides a centrifuge for selectively mounting and rotating a rotor among at least two rotors including a first rotor and a second rotor having a higher possibility of mass eccentricity than that of the first rotor, the centrifuge including a main body, a power generator supported by the main body and having an output shaft generating a rotation torque and a bearing supporting the output shaft, a rotation drive shaft that drivingly connects the selected first rotor to the output shaft to transmit the rotation torque to the first rotor, and a rotatable support shaft that supports the selected second rotor, the rotation drive shaft providing a flexural natural frequency within an operational rotation speed range when the first rotor is connected, and the support shaft being formed with a space through which the rotation drive shaft coaxially extends, and the support shaft having a flexural natural frequency higher than the operational rotation speed range, and the support shaft being rotated at a speed lower than a dangerous rotation speed at which flexural normal vibration of the support shaft occurs when the support shaft supports the second rotor.

BEST MODE FOR CARRYING OUT THE INVENTION

Figure 1:
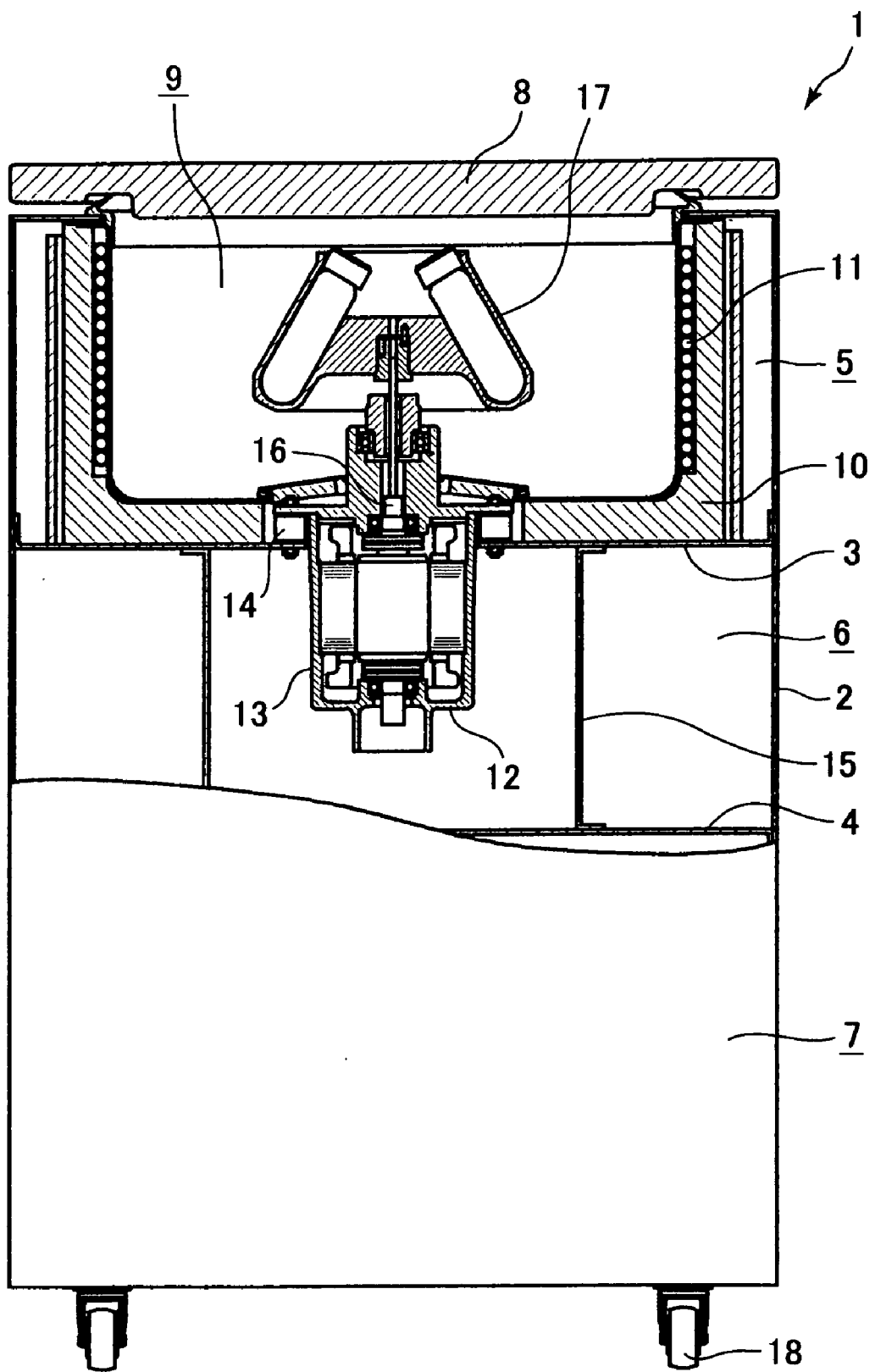
FIG. 1 is a partial cross-sectional front view showing an entire structure of a centrifuge according to a first embodiment of the present invention.

A centrifuge according to a first embodiment of the present invention will now be described with reference to FIGS. 1 and 2. A centrifuge 1 includes a box-like casing 2 formed with an upper open end, and an upper partition 3 and a lower partition 4 fixed horizontally to the casing 2. Thus, the casing 2 is partitioned into an upper chamber 5, a middle chamber 6, and a lower chamber 7 by the partitions. The casing 2 and the partitions 3 and 4 constitute a main body. An opened end of the upper chamber 5 is provided with an openable/closable lid 8. Also, a cup-shaped heat insulating member 10 is provided in the upper chamber 5 for defining a centrifugal chamber 9. A coolant tube 11 for cooling the inside of the centrifugal chamber 9 is provided on an inner peripheral surface of the heat insulating member 10. An opening 10a (FIG. 2) is formed in the bottom part of the heat insulating member 10, and a similar opening is formed also in the upper partition 3. A motor housing 13 of an induction motor 12 as a power generator, is inserted and positioned in the spaces of these openings. The motor housing 13 is suspended from the upper partition 3 via a damper 14 made from rubber. A major part of the motor housing 13 is situated in the middle chamber 6. A freezing machine not shown is provided in the lower chamber 7, to circulate the coolant through the coolant tube 11.

In FIG. 1, an angle rotor 17 is connected to and supported by a rotor (output shaft) 16 of the induction motor 12 via an elastic shaft 30 described later. The upper partition 3 is also supported by the lower partition 4 via a rib 15 extending in the vertical direction in the middle chamber 6. Accordingly, rotation load due to mass eccentricity of the angle rotor 17 caused by rotation of the induction motor 7 is absorbed by the damper 14. The mass of the angle rotor 17 and the induction motor 12 are supported by the partitions 3 and 4 and the rib 15. In addition, casters 18 are provided on the bottom of the casing 2 for setting the centrifuge movable.

Figure 2:
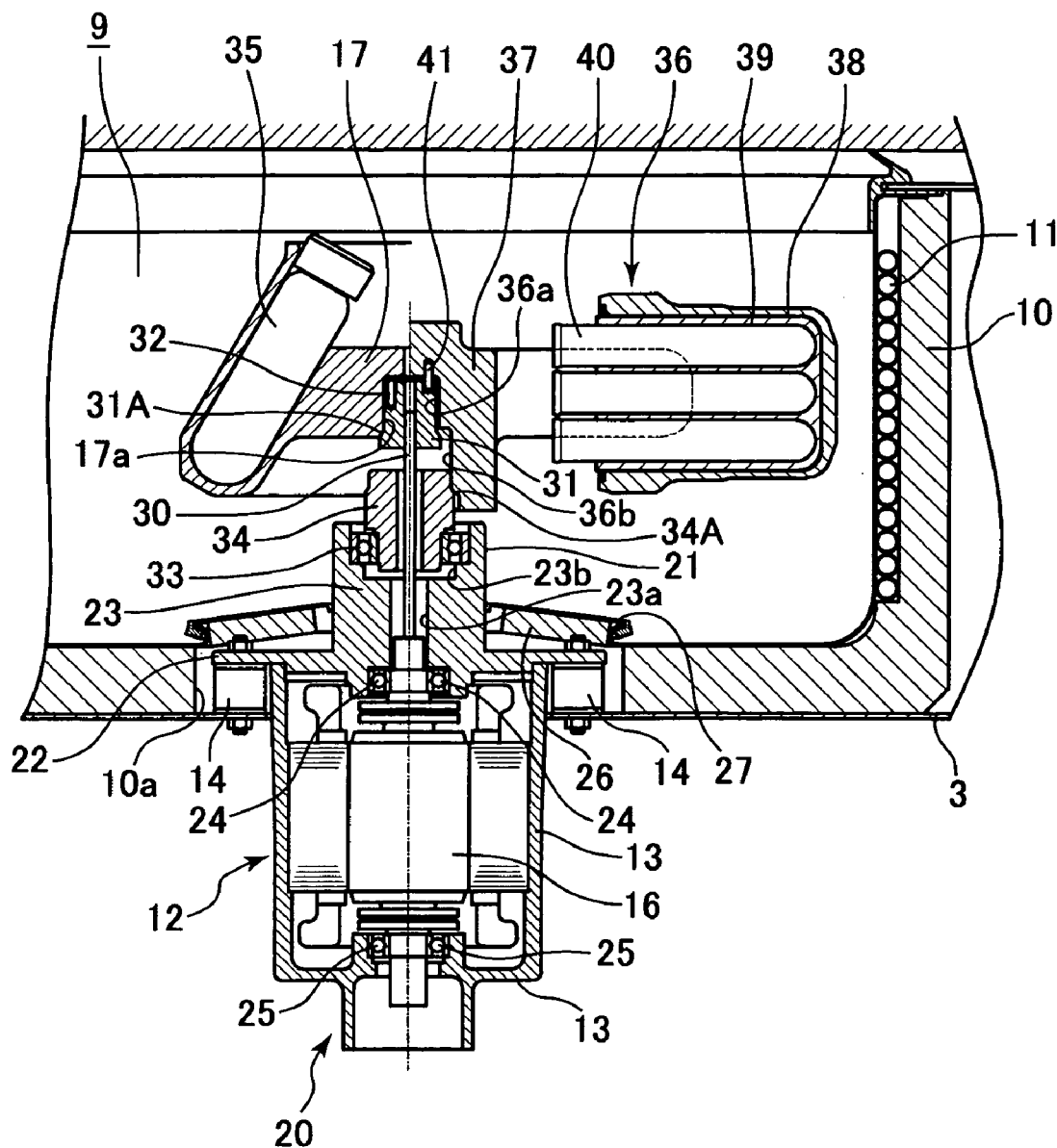
FIG. 2 is a cross-sectional view showing an essential part of the centrifuge according to the first embodiment and, the left and right halves show respectively situations in which a high-speed angle rotor and a low-speed swing rotor are installed and rotationally driven.

FIG. 2 shows a drive section 20 for driving the rotor. The drive section 20 has, in addition to the induction motor 12 described above, an end bracket 21 which also serves as a housing of the induction motor 12, an elastic shaft 30 as a rotation drive shaft, a high-rigidity rotation shaft 34 as a support shaft, and a crown portion 31. As has been described previously, the elastic shaft means a shaft which causes elastic deformation such as flexure within operational rotation speed range, and the high-rigidity shaft means a shaft which is rigid within operational rotation speed range. The end bracket 21 includes a flange portion 22 which forms part of the motor housing 13, and a hollow bearing support portion 23 protruding from the flange portion 22 in coaxial with the output shaft 16. The bearing support portion 23 includes a motor-side small inner diameter portion 23*a* and an opposite-motor-side large inner diameter portion 23*b*. The flange portion 22 is connected to the damper 14 described above and supported on the upper partition 3. The output shaft 16 is supported rotatably by a bearing 24 provided in the bearing support portion 23, and by a bearing 25 provided in the bottom portion of the motor housing 13, to sustain thrust loads from the output shaft 16. The opening 10*a* in the bottom portion of the heat insulating member 10 is closed by a cover 26 positioned around the bearing support portion 23. The upper surface of the cover 26 is covered with a rubber member 27 to prevent air from being introduced into the centrifugal chamber 9 through the opening 10*a* due to rotation of the rotor.

The upper end side of the output shaft 16 is coaxially connected to the lower end of the elastic shaft 30, and the elastic shaft 30 extends upwards through the internal space of the bearing support portion 23. The crown portion 31 is fixed to an upper end of the shaft 30. The elastic shaft 30 is designed to have a primary natural frequency within a low-speed range (several ten to several hundred rpm.) The crown portion 31 has an upper end implanted with a pair of pins 32 extending vertically upward to be engaged with one of the rotors 17 and 36, and has a lower end formed with a tapered portion 31A. Note that the pair of pins 32 are provided at positions on an imaginary identical circle but are offset from identical diametrical positions of the imaginary circle (see FIG. 9).

Immediately below the crown portion 31, the high-rigidity shaft 34 is supported by a bearing (bearing) 33 provided in the large inner diameter portion 23*b* of the bearing support portion 23 of the end bracket 21. The high-rigidity shaft 34 is rotatable about an axis coaxial with the elastic shaft 30 and the end bracket 21. A hollow portion is formed in the center part of the high-rigidity shaft 34, in order to allow the elastic shaft 30 to be inserted loosely. A tapered portion 34A is formed at the upper portion of the shaft 34, and the lower portion thereof forms a reduced-diameter portion which is engaged with the bearing 33. Note that the tapered portion 34A serves as a second crown portion.

Figure 9:
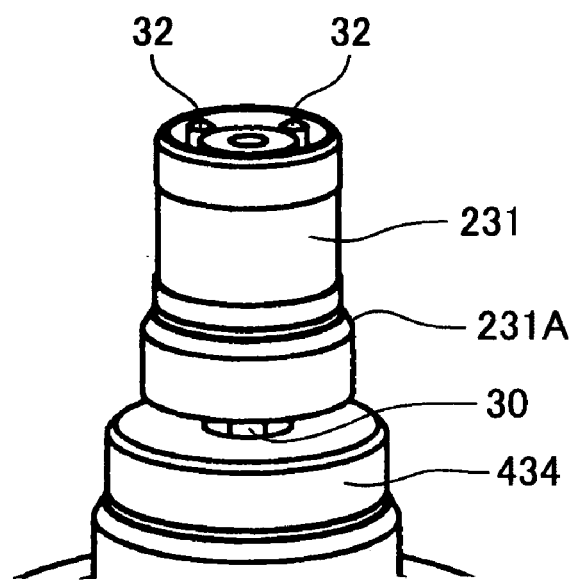
FIG. 9 is a perspective view showing the crown portion and an ambient portion thereof in the fifth embodiment.
Figure 10:
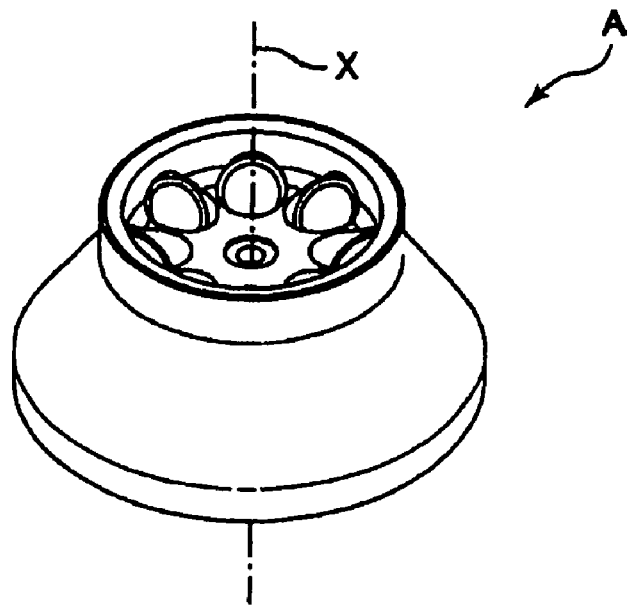
FIG. 10 is a perspective view showing an angle rotor.

The left half of FIG. 2 shows a situation in which the high-speed angle rotor 17 is mounted. The high-speed angle rotor 17 has a substantially circular shape as shown in FIG. 9. In the present embodiment, a concave portion 17*a* is formed as a central coupling portion of the rotor 17. The concave portion 17*a* has a configuration in conformance with the upper end shape and outer peripheral shape of the crown portion 31 and with the shape of the tapered portion 31A. Accordingly, the angle rotor 17 is connected only to the crown portion 31, and is spaced away from the high rigidity shaft 34 avoiding contact nor engagement with the high-rigidity shaft 34. A pair of pins not shown protrude downwardly from the concave portion 17*a*. The pair of pins are positioned on the identical imaginary circle of the pair of pins 32 of the above-mentioned crown portion 31, and arranged on a diametrically opposite side of the imaginary circle. Therefore, when the angle rotor 17 is positioned above the crown portion 31 and set on the crown portion 31, the pins 32 of the crown portion 31 contact the pins of the angle rotor 17 due to rotation of the elastic shaft 30, so that the rotation torque of the elastic shaft 30 can be transmitted to the angle rotor 17. At this time, the pair of pins 32 of the crown portion 31 does not have an interval of 180 degrees, thus preventing the free ends of the pins of the angle rotor from matching with and riding on the upper ends of the pins 32 of the crown portion 31.

Figure 11:
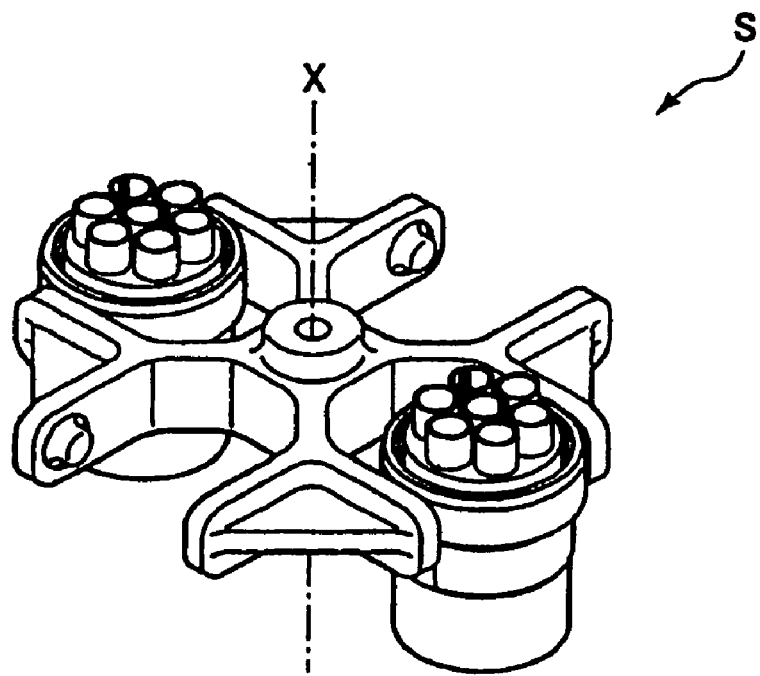
FIG. 11 is a perspective view showing a situation in which buckets equipped with test tubes are attached to arms of the swing rotor.
Figure 12:
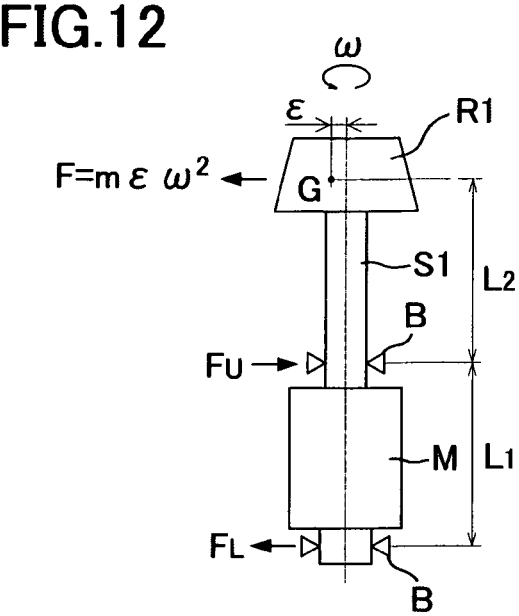
FIG. 12 is a view for description of bearing reaction force caused by imbalance in a high-rigidity shaft.
Figure 13:
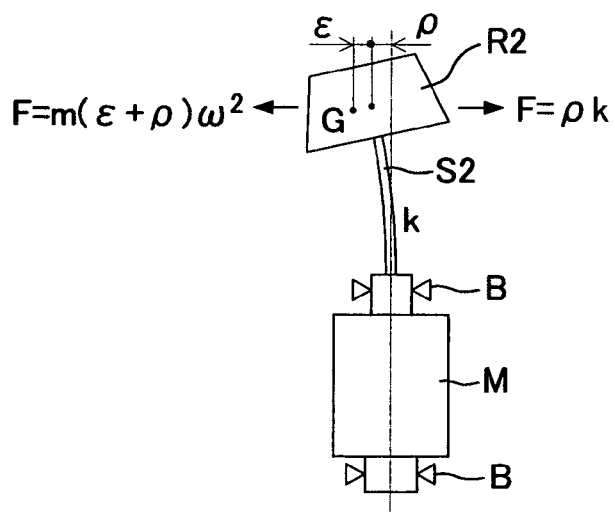
FIG. 13 is a view for description of bearing reaction force caused by imbalance in an elastic shaft.
Figure 14:
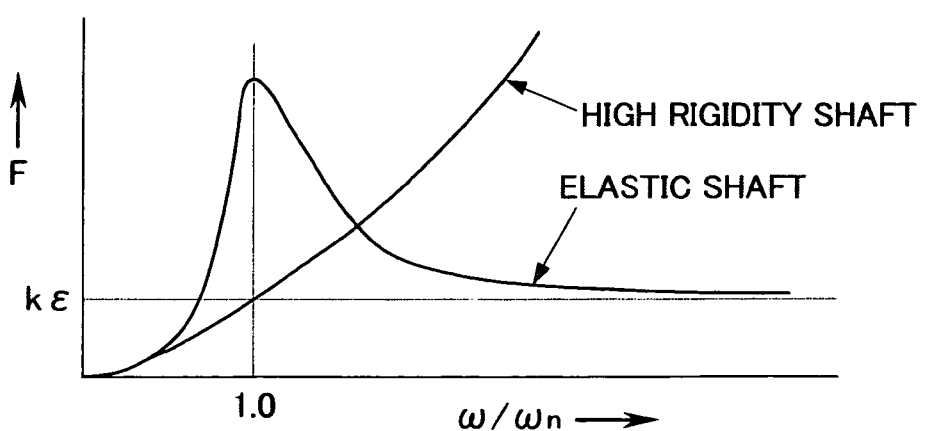
FIG. 14 is a graph showing differences in bearing reaction force between the high-rigidity shaft and the elastic shaft.

The right half of FIG. 2 shows a situation in which the low-speed swing rotor 36 is mounted. The low-speed swing rotor 36 has radially extending arms 37 as shown in FIG. 11, and buckets 38 are pivotally movably supported to the arms 37 through pins not shown. In each bucket 38, a rack 39 formed with a plurality of test tube insertion holes is fixed, and test tubes 40 encapsulating samples are inserted in the rack 39. Note that the situation shown in FIG. 2 shows that the buckets 38 pivotally moved horizontally due to centrifugal force, performing centrifugal separation on the samples. A base portion of each arm 37 of the swing rotor 36 in the present embodiment is provided with a coupling portion having a first concave portion 36*a* and a second concave portion 36*b*. The first concave portion 36*a* does not contact the top and outer peripheral portion of the crown portion 31 nor the tapered portion 31A, and a second concave portion 36*b* has a tapered portion contactable with the tapered portion 34A of the high-rigidity shaft 34. A pair of pins 41 protrude downward from the top portion of the first concave portion 36*a*. The pair of pins 41 are abutable on the pins 32 of the crown portion 31 and are similar to the above-mentioned pins not shown of the angle rotor 17.

The swing rotor 36 and the crown portion 31 can be engaged and connected with each other only through the pins 32 and 41. The swing rotor 36 contacts the tapered portion 34A and is mounted on the high-rigidity shaft 34. Accordingly, if the swing rotor 36 is positioned above the crown portion 31 and set on the tapered portion 34A, the pins 32 of the crown portion 31 is brought into contact with the pins 41 of the swing rotor 36 upon rotation of the elastic shaft 30, so that the rotation torque of the elastic shaft 30 can be transmitted to the swing rotor 36. Also, the mass of the swing rotor 36 cannot be received by the crown portion 31 but by the tapered portion 34A of the high-rigidity shaft 34.

In case of performing centrifugal separation using the high-speed angle rotor 17 with the structure described above, power connection can be provided only between the angle rotor 17 and the crown portion 31 by merely setting the angle rotor 17 on the crown portion 31. Therefore, the thrust load and radial load from the angle rotor 17 are received by the tapered portion 31A of the crown portion 31, so that the angle rotor 17 is rotationally driven by the elastic shaft 30. The primary flexural natural frequency of the elastic shaft 30 is set within a low-speed range. During acceleration, vibration increases when the rotation speed passes the primary natural frequency. However, this vibration can be damped since the drive section 20 is supported by the upper partition 3 through the damper 14 having an external damping function. After the rotation speed exceeds the primary natural frequency, the rotation center comes close to the barycenter position of the angle rotor 17 due to an automatic centering function, so that stable rotation can be obtained. Since the rotational driving is based on the elastic shaft 30, imbalance force caused by variants of samples among the test tubes 35 is not increased in proportion to square of the rotation speed, unlike the high-rigidity shaft.

On the other hand, in case of performing centrifugal separation using the low-speed swing rotor 36, the mass of the swing rotor 36 is supported only by the high-rigidity shaft 34, and the swing rotor 36 and the crown portion 31 are connected only by the pins 32 and pins 41. Therefore, the thrust load and radial load from the swing rotor 36 are received by the tapered portion 34A of the high-rigidity shaft 34, and the rotation of the swing rotor 36 is supported by the bearing 33. That is, the rotation of the swing rotor 36 generated by the elastic shaft 30 is transmitted to the high-rigidity shaft 34 which supports the mass of the swing rotor 36 via the friction force of the tapered portion 34A. The high-rigidity shaft 34 then rotates relative to the end bracket 21 via the bearing 33. In other words, when the swing rotor 36 is rotated, the elastic shaft 30 merely transmits the rotation torque, so that the swing rotor 36 is supported by the high-rigidity shaft 34 and rotated together with the high-rigidity shaft 34. At this time, a maximum rotation speed of the elastic shaft 30 is controlled such that the high-rigidity shaft 34 can be rotated at a speed lower than a dangerous speed which induces primary flexural natural frequency of the high rigidity shaft 34.

As has been described above, the high-speed angle rotor 17 selects automatically the elastic shaft 30 at the time of setting, so that influences (bearing load) on the drive section from imbalance at a high rotation speed range can be minimized. The low-speed swing rotor 36 which has a greater possibility to induce greater imbalance can be supported automatically by the high-rigidity shaft 34 at the time of setting. Therefore, centrifugal separation during low-speed rotation can be easily executed without taking much care of variants among samples.

Figure 3:
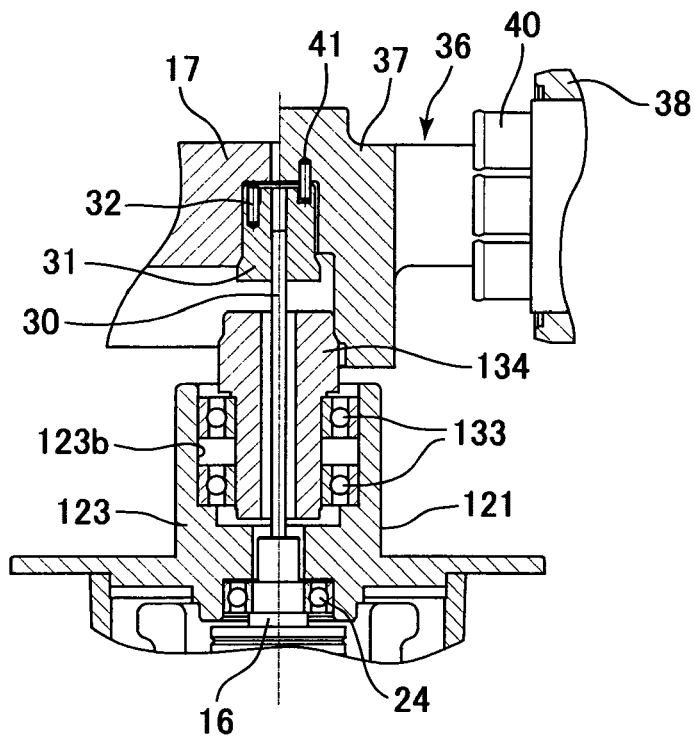
FIG. 3 is a cross-sectional view showing an essential part of a centrifuge according to a second embodiment of the present invention, and the left and right halves show respectively situations in which a high-speed angle rotor and a low-speed swing rotor are installed and rotationally driven.

A centrifuge according to a second embodiment of the present invention will next be described with reference to FIG. 3. The same reference numerals in the following description as those of the foregoing embodiment are respectively denoted at equal numerals to avoid duplicating description.

In the first embodiment, the high-rigidity shaft 34 is rotatably supported by a single bearing 33. In contrast, in the second embodiment, the high-rigidity shaft 134 is rotatably supported by two bearings (bearings) 133 and 133. To this effect, an axial length of a reduced outer diameter portion of the high-rigidity shaft 134 is made longer than that of the first embodiment, and an axial length of a large inner diameter portion 123b of a bearing support portion 123 of an end bracket 121 is also made longer than that of the first embodiment, so that two bearings 133 can be assembled.

According to the structure in the second embodiment, unwanted slanting of the rotation axis of the high-rigidity shaft 134 can be avoided more effectively, and reaction force which acts on the bearing 133 can be dispersed. Accordingly, an advantage can be expected in that the loads acting on the respective bearings 133 and bearings 24 and 25 (FIG. 2) are reduced to prolong their service life.

Figure 4:
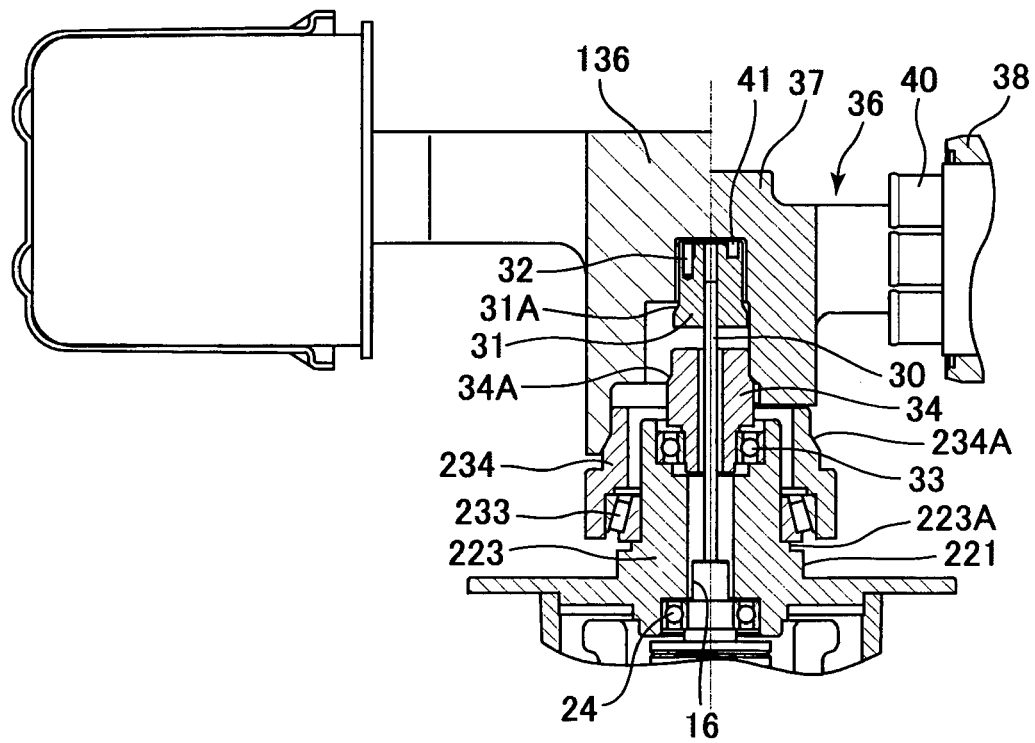
FIG. 4 is a cross-sectional view showing an essential part of the centrifuge according to a third embodiment, and the right and left halves show respectively situations in which a low-speed swing rotor and an ultra-low-speed large size swing rotor are mounted and rotationally driven.

A centrifuge according to a third embodiment of the present invention will now be described with reference to FIG. 4. The third embodiment enables selective setting of the above-described swing rotor 36 or a second swing rotor 136 which is larger than the swing rotor 36. Therefore, in addition to the high-rigidity shaft 34 in the first embodiment, a second high-rigidity shaft 234 is provided rotatably and coaxially, outside in the radial direction of the high-rigidity shaft 34. A stepped portion 223A is formed in the outer peripheral surface of a bearing support portion 223 of the end bracket 221, and a bearing (bearing) 233 having a large load resistive capacity is engaged with the step portion 223A. The second high-rigidity shaft 234 is rotatably supported by the bearing support portion 223 via the bearing 233. A tapered portion 234A capable of contacting a tapered surface of the second swing rotor 136 is formed in the outer peripheral surface of the high-rigidity shaft 234. The tapered portion 234A serves as a third crown portion.

Similar to the first embodiment, when the swing rotor 36 is set, the swing rotor 36 is engaged only with the high-rigidity shaft 34, and the swing rotor 36 and the crown portion 31 are connected only by the pins 32 and 41. Therefore, the thrust load and radial load from the swing rotor 36 are received by the tapered portion 34A, and the swing rotor 36 is rotatably supported by the end bracket 221 via the bearing 33 through the high-rigidity shaft 34.

On the other hand, when the large swing rotor 136 is set, the swing rotor 136 and the crown portion 31 are connected only by the pins 32 and the pins not shown of the swing rotor 136, like the swing rotor 36. Then, the thrust load and the radial load from the swing rotor 136 are received by the tapered portion 234A, and the swing rotor 136 is rotatably supported by the end bracket 221 via the bearing 233 through the second high-rigidity shaft 234. That is, rotation of the swing rotor 136 generated by the rotation of the elastic shaft 30 is transmitted to the second high-rigidity shaft 234 which supports the mass of the swing rotor 136 via friction force of the tapered portion 234A, so that the high-rigidity shaft 234 rotates relative to the end bracket 221. In other words, in case of rotating the swing rotor 136, the elastic shaft 30 simply transmits only the rotation torque. The swing rotor 136 is supported by the second high-rigidity shaft 234 and rotated together with the high-rigidity shaft 234. The large swing rotor 136 is supported by the bearing 233 which has a large load resistive capacity. Therefore, the lifetime of the bearings 233, 33, 24, and 25 (FIG. 2) can be prolonged, resulting in prolongation of the service life of the entire device.

Figure 5:
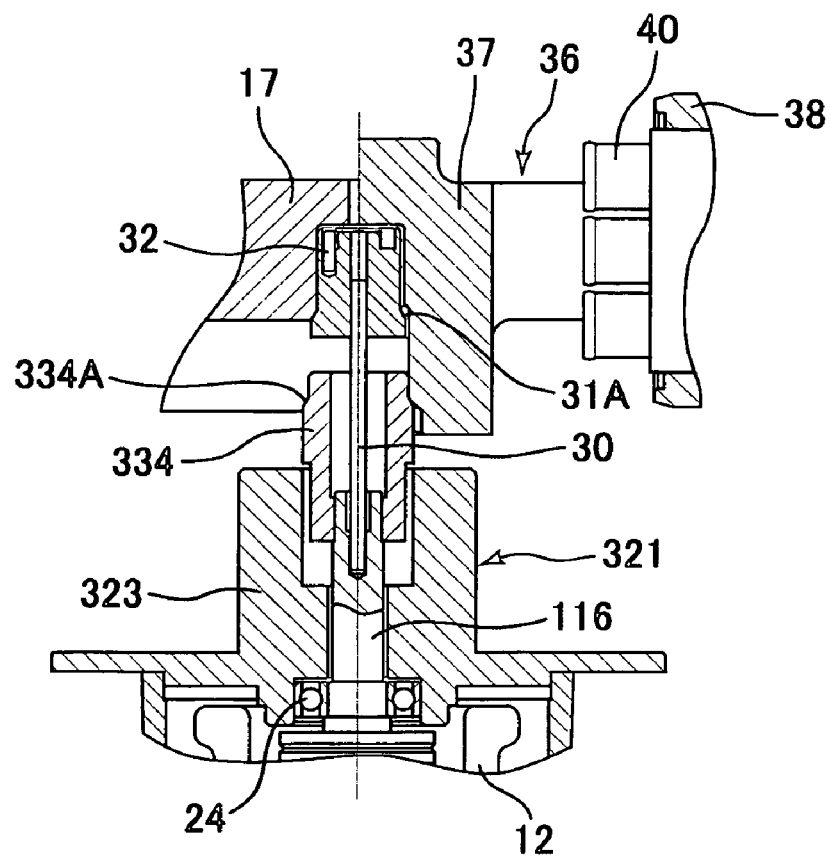
FIG. 5 is a cross-sectional view showing an essential part of a centrifuge according to a fourth embodiment of the present invention, and the left and right halves show respectively situations in which a high-speed angle rotor and a low-speed swing rotor are mounted and rotationally driven.

A centrifuge according to a fourth embodiment of the present invention will be described with reference to FIG. 5. In the present embodiment, the length of upward protrusion of the output shaft 116 of the motor 12 is increased, and an elastic rotation shaft 30 is coaxially coupled with the top end portion of the protrusion. Further, a hollow high-rigidity rotation shaft 334 is coaxially coupled with the outer circumferential surface of the top end portion of the output shaft 116. A tapered surface 334A is formed in the outer peripheral surface of the high-rigidity rotation shaft 334 for receiving the swing rotor 36.

With this structure, setting of the angle rotor 17 is the same as that of the first embodiment. When the swing rotor 36 is set, the tapered surface of the concave portion of the swing rotor 36 contacts the tapered surface 334A of the high-rigidity rotation shaft 334. Rotation torque of the induction motor 12 is directly transmitted to the high-rigidity rotation shaft 334, so that the rotation force can be transmitted to the swing rotor 36 by the friction force of the tapered portion 334A. Therefore, transmission of torque by the contact between pins like the foregoing embodiments is not required. This structure is advantageous when the rotation torque is so large that the moment acting on the pins is large or when distortion stress on the elastic shaft 30 cannot be neglected.

Figure 6:
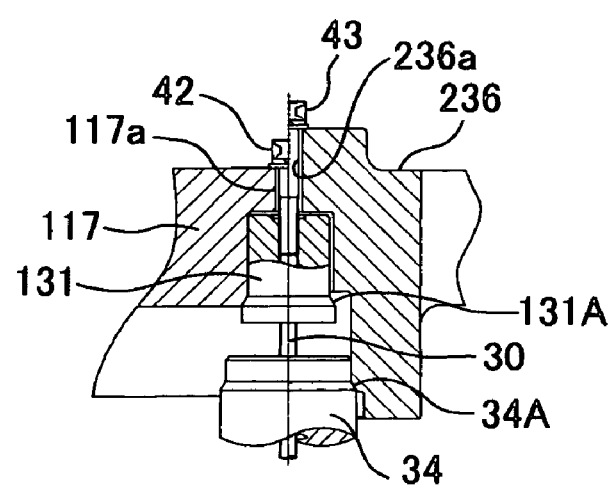
FIG. 6 shows a modification regarding a structure for transmitting rotation torque of a rotation shaft to a rotor.

FIG. 6 shows a modification concerning transmission of torque. In the embodiments described above, the rotation torque transmission from the elastic rotation shaft 30 is achieved by contact between the pins 32 and the pins 41. However, in the modification, screws 42 and 43 are used in place of the pins. The screw 42 serves to connect an angle rotor 117 to the crown portion 131, and the screw 43 serves to connect a swing rotor 236 to the crown portion 131. A through hole 117a of the angle rotor 117 is not threadingly engaged with the screw 42, but is movable relative to the screw 42. The screw 42 is threadingly engaged only with the crown portion 131. Further, the mass of the angle rotor 117 is supported by the tapered portion 131A. Similarly, a through hole 236a of the swing rotor 236 is not threadingly engaged with the screw 43 but is movable relative to the screw 43. The screw 43 is threadinly engaged only with the crown portion 131. Further, the mass of the swing rotor 236 is supported by the tapered portion 34A of the high-rigidity shaft 34, like the foregoing embodiments.

Figure 7:
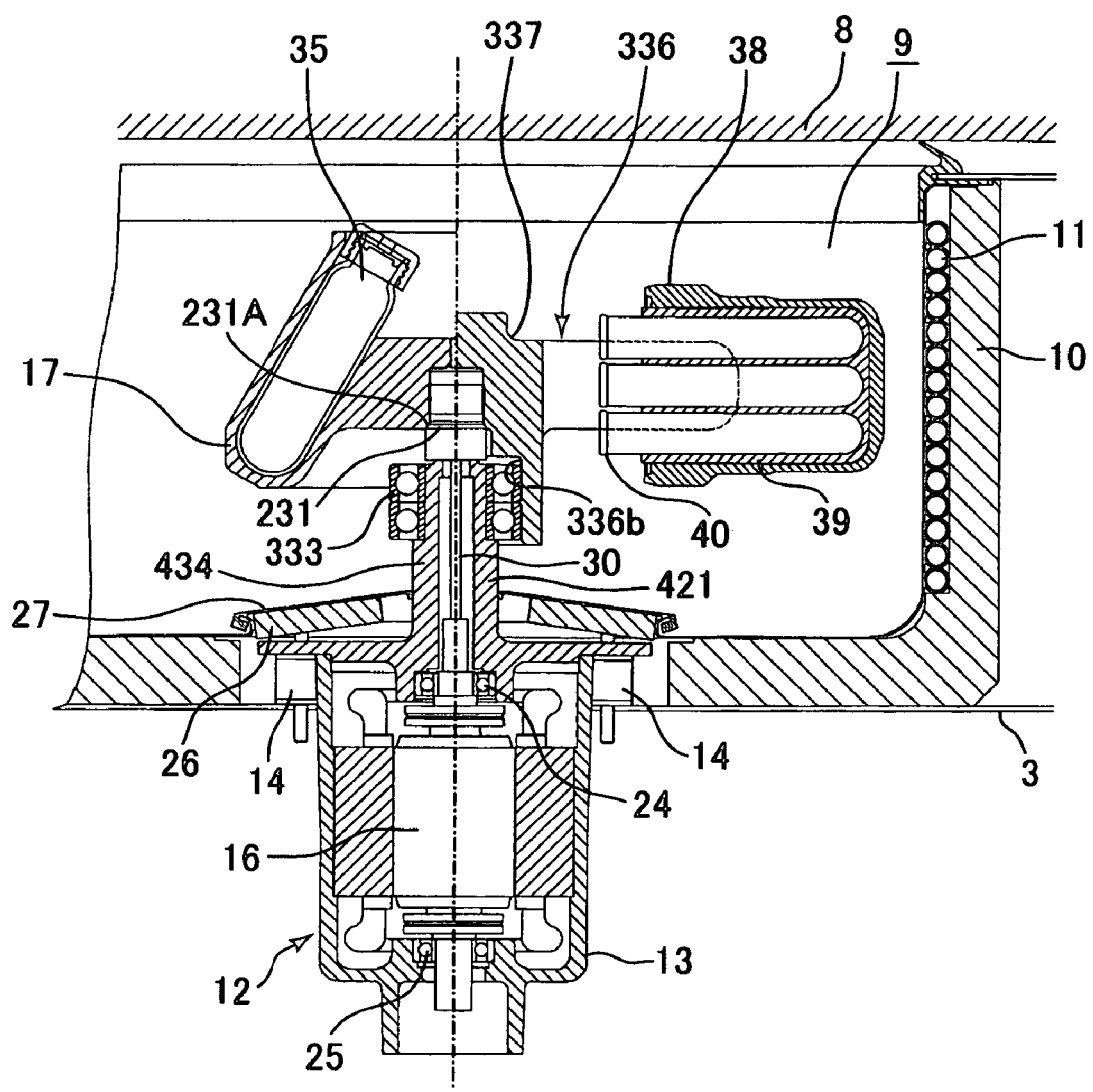
FIG. 7 is a cross-sectional view showing an essential part of a centrifuge according to a fifth embodiment of the present invention, and the left and right halves show respectively situations in which a high-speed angle rotor and a low-speed swing rotor are installed and rotationally driven.
Figure 8:
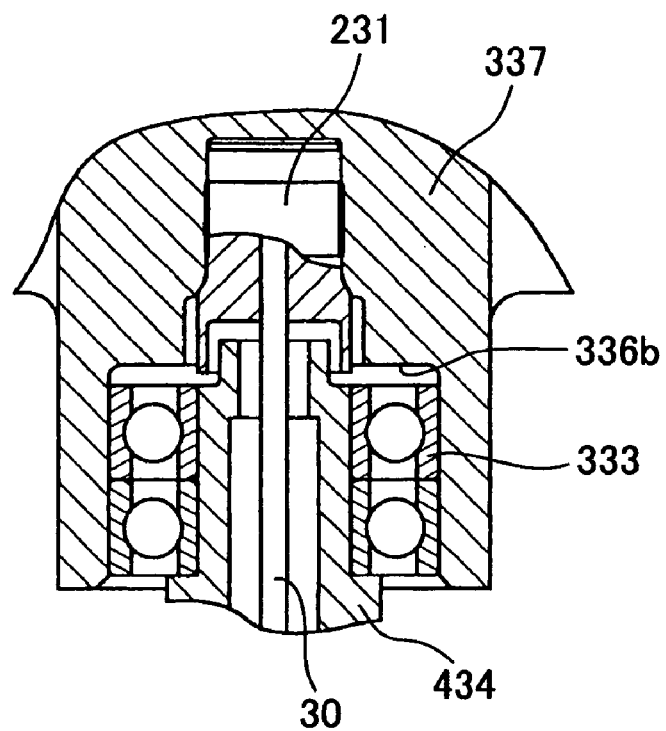
FIG. 8 is a cross-sectional view showing an essential part of the fifth embodiment for description of the positional relationship among an elastic shaft, a crown portion, a high-rigidity shaft, and a swing rotor.

A centrifuge according to a fifth embodiment of the present invention will next be described with reference to FIGS. 7 to 9. In the embodiments described above, each of the high-rigidity shafts 34, 134, 234, and 334 is a rotation shaft. However, in the fifth embodiment, a high-rigidity shaft as a support shaft is a fixed shaft 434. A bearing support portion of an end bracket 421 is used directly as the fixed shaft 434. An outer peripheral surface of the fixed shaft 434 in an upper end side forms a reduced outer diameter portion, and two bearings (bearings) 333 are assembled to the reduced outer diameter portion. Further, an inner peripheral surface of a concave portion 336b in a coupling portion 337 of a swing rotor 336 is engagable with an outer race of the bearings 333, so that the swing rotor 336 is rotatable about the bearing support portion (fixed shaft) 434 via the bearings 333.

Similar to the first embodiment, when the high-speed rotation angle rotor 17 is set, the angle rotor 17 provides a driving connection to the crown portion 231 merely by mounting the angle rotor 17 on the crown portion 231. At this time, the pair of pins 32 of the crown portion 231 contact the pair of pins of the angle rotor (not shown). Therefore, the thrust load and the radial load from the angle rotor 17 are received by a tapered portion 231A of the crown portion 231, and the angle rotor 17 is rotationally driven by the elastic shaft 30 due to contact between the pins. Since the angle rotor 17 is spaced away from the bearings 333, rotation of the bearings 333 does not occur.

On the other hand, when the low-speed rotation swing rotor 336 is set, the swing rotor 336 is rotatably supported by the bearing support portion 434 via the bearings 333. Therefore, movement of the swing rotor 336 in the radial direction is restricted by the bearing support portion 434. Although rotation torque is transmitted to the swing rotor 336 from the elastic shaft 30, excessive deformation of the elastic shaft 30 does not occur and there is no risk of damages to the elastic shaft 30 because movement of the swing rotor 336 in the radial direction is restricted. In other words, since the coupling portion 337 of the swing rotor 336 is engaged with the bearings 333, the elastic shaft 30 takes only the function to transmit the rotational drive force and to support the thrust load from the swing rotor 336. Accordingly, increase in the amplitude at the primary flexural resonance rotation speed can be restricted in the elastic shaft 30. Further, imbalance of samples causes the center of rotation to shift to the mass eccentricity point during operation at a higher speed than the primary resonance rotation speed. Further, bending stress is not substantially imparted on the elastic shaft 30 because the bearing support portion 434 operates as a rigid fixed shaft, irrespective of the fact that the applied rotor may be rotated at the mass eccentricity due to imbalance of the samples if the rotor is rotated at a rotation speed higher than the primary resonance rotation speed. Although the bearings 333 must receive the greater part of load due to mass eccentricity, the problem of lifetime of the bearing can be overcome as long as bearings suitable for a low speed and having a large diameter and large load resistive capacity are selected. In this way, also in the present embodiment, the angle rotor having a low tendency toward mass eccentricity is rotated at a high speed, in association with only the elastic shaft 30. With respect to the swing rotor 336 which easily causes mass eccentricity at a low speed, only the coupling portion 337 is engaged with the bearings 333. Therefore, the bearings 333 and the bearing support portion 434 can be used as a rigid shaft. Consequently, the centrifuge is capable of operating the large capacity swing rotor 336 which easily causes mass eccentricity at a low speed.

Centrifuges according to the present invention are not limited to the embodiments described above but various modifications can be made within the scope described in the claims. For example, the motor serving as the power generator is not limited to the induction motor but various motors are available, e.g., an electric motor such as a DC motor, and a fluid-operated motor such as an air turbine and an oil turbine as long as rotation torque can be obtained.

In each of the embodiments, rotors are not limited to those shown in the foregoing embodiments but various rotors are available as long as those rotors have shapes which fit into the crown portion or the tapered portion.

In addition, the elastic rotation shaft is not limited to that of the above-described embodiments but shafts made from various materials are available as long as the shafts have a rigidity lower than that of the high-rigidity shaft.

In the fourth embodiment, if necessary, a bearing can be interposed between the inner peripheral surface of the concave portion of the bearing support portion 323 of the end bracket 321 and the outer peripheral surface of the high-rigidity rotation shaft 334. Also in the fourth embodiment, the elastic shaft 30 can be replaced by a high-rigidity rotation shaft.

In the modification shown in FIG. 6, the through hole 117a of the angle rotor 17 is not threadingly engaged with the screw 42 but is movable relative to the screw 42. However, a male screw coaxial with the elastic shaft 30 can protrude from the upper end of the crown portion 131 and can be screwed with a nut through the through hole 117a.

Further, in the first embodiment, the pair of pins 32 of the crown portion 31 can be arranged at an interval of 180 degrees, as well as the pair of pins in the rotor side also arranged at an interval of 180 degrees. Even in this case, the free ends of the pins of the angle rotor can be prevented from aligning with and mounting on the free ends of the pins 32 of the crown portion 31 by forming the free ends of all pins to have acute angle. Further, a pair of pins are provided in each of the crown portion side and the rotor side. However, at least one pin is sufficient for each side.

INDUSTRIAL APPLICABILITY

When a plurality of test tubes each containing samples are set in a rotor, centrifugal separation can be performed on the samples without considering great variants in amount of samples among the test tubes. Therefore, the user needs only to take little care of operation of the centrifuge, resulting in high industrial applicability. The centrifuge according to the present invention is used for separation and analysis of various samples in the various fields such as medicine, pharmacy, agriculture, and the like.

The invention claimed is:

1. A centrifuge for selectively mounting and rotating a rotor among a plurality of rotors each having a kind or a size different from each other, comprising:
   a frame body;
   a power generator supported by the frame body and having an output shaft which generates rotation torque, the power generator having an end portion supporting the output shaft via a bearing;
   a rotation drive shaft rotatable upon rotation of the output shaft and having a first flexural rigidity;
   a support shaft positioned in the vicinity of the rotation drive shaft and having a second flexural rigidity which is higher than the first flexural rigidity; and
   the rotation drive shaft and the support shaft providing a relationship arranged to allow a selected one of the rotors to be selectively set only on the rotation drive shaft, or only on the support shaft or on both the rotation drive shaft and the support shaft dependent on the selected rotor, whereby one of the first flexural rigidity, the second flexural rigidity, and a composite flexural rigidity between the first and second flexural rigidities is exhibited dependent on the selected rotor.

2. The centrifuge as claimed in claim 1, wherein the plurality of rotors comprises at least a first rotor and a second rotor, and
   wherein the rotation drive shaft has a first crown portion engageable with the first rotor to rotationally support the first rotor; and
   the centrifuge further comprising at least one first pin protruding from and fixed to the first crown portion of the rotation drive shaft, and at least one second pin protruding from and fixed to a portion of the first rotor or a portion of the second rotor, each portion being connectable to the first crown portion, rotational torque of the rotation drive shaft being transmitted to the first rotor or the second rotor upon contact between the first pin and the second pin.

3. The centrifuge as claimed in claim 1, wherein the plurality of rotors comprises at least a first rotor and a second rotor, and
   wherein the rotation drive shaft has a first crown portion engageable with the first rotor to rotationally support the first rotor; and
   wherein the support shaft is disconnected from the output shaft and supports a thrust load and a radial load from the selected second rotor or only supports the radial load of the selected second rotor, the rotation torque and/or the thrust load being transmitted to the second rotor by the first crown portion of the rotation drive shaft.

4. The centrifuge as claimed in claim 1, wherein the power generator comprises one of an electric motor and a fluid-operated motor.

5. A centrifuge for mounting and rotating a rotor selected from a plurality of rotors including a first rotor and a second rotor having a kind or a size different from each other, comprising:
   a frame body;
   a power generator supported by the frame body and having an output shaft which generates rotation torque, the power generator having an end portion supporting the output shaft via a first bearing;
   a first shaft that drivingly connects a selected one of the rotors to the output shaft to transmit the rotation torque to the selected rotor, the first shaft having a first flexural rigidity and being positioned such that both of the first and the second rotors can be connected therewith; and
   a second shaft formed coaxially with and extending along the first shaft to support the selected rotor, the second shaft having a second flexural rigidity higher than the first flexural rigidity, and being positioned such that only the first or the second rotor can be supported thereby.

6. The centrifuge as claimed in claim 5, wherein the plurality of rotors comprises at least a first rotor and a second rotor, the rotation drive shaft being mainly configured to transmit rotation torque of the output shaft to the selected first rotor, and the support shaft being mainly configured to support the selected second rotor, the support shaft being rotatable by the rotation of the rotation drive shaft via the selected second rotor.

7. The centrifuge as claimed in claim 6, wherein the rotation drive shaft and the support shaft are concentric with the output shaft.

8. The centrifuge as claimed in claim 6, wherein the rotation drive shaft has a first crown portion engageable with the first rotor to support the rotating first rotor, and
   wherein the support shaft is formed with a space allowing the rotation drive shaft to extend therethrough, and the support shaft has a second crown portion engageable with the second rotor to support rotating second rotor.

9. The centrifuge as claimed in claim 8, wherein the support shaft is rotatably supported by the end portion of the power generator via a bearing, the second rotor being connected also to the first crown portion and rotationally driven by the rotation drive shaft, while being supported by the second crown portion.

10. The centrifuge as claimed in claim 8, wherein the support shaft is disconnected from the output shaft and supports a thrust load and a radial load from the selected second rotor or only supports the radial load of the selected second rotor, the rotation torque and/or the thrust load being transmitted to the second rotor by the first crown portion of the rotation drive shaft.

11. The centrifuge as claimed in claim 8, wherein the rotation drive shaft provides a flexural natural frequency in an operational rotation speed range when the first rotor is selected, and wherein the support shaft is rotated at a speed lower than a dangerous speed at which flexural natural frequency with respect to the support shaft occurs when the second rotor is selected.

12. The centrifuge as claimed in claim 8, wherein the rotation drive shaft comprises an elastic shaft, and the support shaft comprises a high-rigidity shaft which is rigid within an operational rotation speed range, and wherein the first rotor has an allowable rotation speed higher than that of the second rotor.

13. The centrifuge as claimed in claim 8, further comprising at least one cylindrical rotation shaft rotatably provided around and concentric with the support shaft, the at least one cylindrical rotation shaft having a third crown portion for supporting a third rotor providing a rotational load different from that of the second rotor.

14. The centrifuge as claimed in claim 13, wherein the rotation drive shaft comprises an elastic shaft, and wherein the support shaft and the at least one cylindrical rotation shaft comprise high-rigidity shafts.

15. The centrifuge as claimed in claim 5, wherein the plurality of rotors comprises at least the first rotor and the second rotor, the rotation drive shaft being mainly configured to transmit rotation torque of the output shaft to the selected first rotor, and the support shaft being mainly configured to support the selected second rotor, the support shaft being unrotatably extending and being attached with an additional bearing to which the second rotor is fittable.

16. The centrifuge as claimed in claim 15, wherein the rotation drive shaft and the support shaft are concentric with the output shaft.

17. The centrifuge as claimed in claim 16, wherein the rotation drive shaft has a first crown portion engageable with the first rotor to support the rotating first rotor, and
   wherein the support shaft is formed with a space allowing the rotation drive shaft to extend therethrough, and
   wherein the second rotor is rotatably supported to the support shaft via the bearing attached to the support shaft, and the second rotor is connected also to the first crown portion and rotated by the rotation drive shaft and supported by the support shaft through the attached bearing.

18. The centrifuge as claimed in claim 15, wherein the rotation drive shaft provides a flexural natural frequency in an operational rotation speed range when the first rotor is selected, and wherein the support shaft is rotated at a speed lower than a dangerous speed at which flexural natural frequency with respect to the support shaft occurs when the second rotor is selected.

19. The centrifuge as claimed in claim 15, wherein the plurality of rotors comprises at least a first rotor and a second rotor, the rotation drive shaft being mainly adapted for transmitting rotation torque of the output shaft to the selected first rotor, and the support shaft being mainly adapted for supporting the selected second rotor, the support shaft being rotatable through direct connection to the output shaft.

20. The centrifuge as claimed in claim 19, wherein the support shaft is directly connected to the output shaft for drivingly rotating the second rotor and for supporting the second rotor.

21. A centrifuge for selectively mounting and rotating a rotor among at least two rotors including a first rotor and a second rotor each having a kind or a size different from each other, comprising:
   a frame body;
   a power generator supported by the frame body and having an output shaft which generates rotation torque, the power generator having an end portion supporting the output shaft via a bearing;
   a rotation drive shaft that drivingly connects the selected one of the first and second rotors to the output shaft to transmit the rotation torque to the selected one of the first and second rotors, the rotation drive shaft having a first flexural rigidity; and
   a support shaft that supports the selected second rotor, the support shaft being rotatable by the rotation of the rotation drive shaft via the selected second rotor, and having a flexural rigidity higher than the first flexural rigidity.

22. A centrifuge for selectively mounting and rotating a rotor among at least two rotors including a first rotor and a second rotor each having a kind or a size different from each other, comprising:
   a frame body;
   a power generator supported by the frame body and having an output shaft which generates rotation torque, the power generator having an end portion supporting the output shaft via a bearing;
   a rotation drive shaft that drivingly connects the selected one of the first and second rotors to the output shaft to transmit the rotation torque to the selected one of the first and second rotors, the rotation drive shaft having a first flexural rigidity; and
   a support shaft that supports the selected second rotor, the support shaft being rotatably and coaxially disposed in spaced relation with the rotation drive shaft and being disposed via a second bearing onto a member fixed to the frame body, and the support shaft having a second flexural rigidity higher than the first rigidity.

23. A centrifuge for selectively mounting and rotating a rotor among at least two rotors including a first rotor and a second rotor providing a mass eccentricity greater than that of the first rotor due to imbalance of samples, comprising:
   a frame body;
   a power generator supported by the frame body and having an output shaft which generates rotation torque, the power generator having an end portion supporting the output shaft via a bearing;
   a rotation drive shaft that drivingly connects the selected first rotor to the output shaft to transmit the rotation torque to the first rotor, said rotation drive shaft having a first flexural rigidity; and
   a rotatable support shaft that supports the selected second rotor and having a second flexural rigidity higher than the first rigidity;
   the rotation drive shaft providing a flexural natural frequency attendant to the first rotor within an operational rotation speed range when the first rotor is connected; and
   the support shaft being formed with a space through which the rotation drive shaft concentrically extends, and the support shaft having a flexural normal frequency attendant to the second rotor higher than the operational rotation speed range, and the support shaft being rotated at a speed lower than a dangerous rotation speed at which the flexural natural frequency of the support shaft occurs when the support shaft supports the second rotor.

24. A centrifuge for mounting and rotating a rotor selected from a plurality of rotors including a first and a second rotor comprising:
   a frame body;
   a power generator supported by the frame body and having an output shaft which generates rotation torque, the power generator having an end portion supporting the output shaft via a bearing;
   a rotation drive shaft that drivingly connects a selected one of the first and second rotors to the output shaft to transmit the rotation torque to the selected one of the first and second rotors, the rotation drive shaft having a first flexural rigidity;
   a first support shaft that supports the selected first rotor, the first support shaft having a second flexural rigidity, and being rotatable by the rotation of the rotation drive shaft via the selected first rotor; and a second support shaft that supports the selected second rotor, the second support shaft having a third flexural rigidity and being rotatable by the rotation of the rotation drive shaft via the selected second rotor, the second and third flexural rigidity being higher than the first flexural rigidity.

25. A centrifuge for mounting and rotating a rotor selected from a plurality of rotors including a first and a second rotor comprising:
- a frame body;
- a power generator supported by the frame body and having an output shaft which generates rotation torque, the power generator having an end portion supporting the output shaft via a bearing;
- a rotation drive shaft that drivingly connects a selected one of the first and second rotors to the output shaft to transmit the rotation torque to the selected one of the first and second rotors, the rotation drive shaft having a first flexural rigidity; and
- a support shaft that supports the selected second rotor, the support shaft having a second flexural rigidity higher than the first flexural rigidity and being connected with the rotation drive shaft.

26. A centrifuge for selectively mounting and rotating a rotor selected from a plurality of rotors including a first and a second rotor comprising:
- a frame body;
- a power generator supported by the frame body and having an output shaft which generates rotation torque, the power generator having an end portion supporting the output shaft via a first bearing;
- a rotation drive shaft that drivingly connects the selected one of the first and second rotors to the output shaft to transmit the rotation torque to a selected one of the first and second rotors, the rotation drive shaft having a first flexural rigidity; and
- a support shaft having a second flexural rigidity higher than the first flexural rigidity and being unrotatably disposed in spaced relation with the rotation drive shaft to support the selected second rotor via a second bearing, so that the selected second rotor is rotatable by the rotation of the rotation drive shaft.

* * * * *

UNITED STATES PATENT AND TRADEMARK OFFICE
CERTIFICATE OF CORRECTION

| | | |
|---|---|---|
| PATENT NO. | : 7,108,651 B2 | Page 1 of 1 |
| APPLICATION NO. | : 10/475184 | |
| DATED | : September 19, 2006 | |
| INVENTOR(S) | : Tatsuya Konno et al. | |

It is certified that error appears in the above-identified patent and that said Letters Patent is hereby corrected as shown below:

On the face of the patent, under section (73) Assignee: please correct "Hitachi Koko Co., Ltd., Tokyo (JP)" to -- Hitachi Koki Co., Ltd., Tokyo (JP) --

Signed and Sealed this
Seventh Day of June, 2011

David J. Kappos
*Director of the United States Patent and Trademark Office*